United States Patent [19]

Braukmann et al.

[11] 4,308,142
[45] Dec. 29, 1981

[54] BACK-FLUSH FILTERING APPARATUS, PARTICULARLY FOR A HOUSE WATER SUPPLY SYSTEM

[75] Inventors: Bernhard W. Braukmann; Eberhard Gocke, both of Mosbach, Fed. Rep. of Germany

[73] Assignee: Honeywell, Inc.

[21] Appl. No.: 144,410

[22] Filed: Apr. 28, 1980

[30] Foreign Application Priority Data

Apr. 27, 1979 [DE] Fed. Rep. of Germany ....... 2917090

[51] Int. Cl.³ .............................................. B01D 29/02
[52] U.S. Cl. ..................................... 210/355; 210/411
[58] Field of Search .................. 210/108, 355, 411–415

[56] References Cited

U.S. PATENT DOCUMENTS

| | | | |
|---|---|---|---|
| 1,153,920 | 9/1915 | Hotchkiss | 210/355 |
| 1,611,739 | 12/1926 | Hadfield | 210/411 |
| 1,965,912 | 7/1934 | Strawn | 210/354 X |
| 2,090,962 | 5/1978 | Braukmann | 210/108 |
| 2,747,741 | 5/1956 | Jacobson | 210/411 X |
| 2,835,390 | 5/1958 | King | 210/411 |

*Primary Examiner*—John Adee
*Attorney, Agent, or Firm*—McGlew and Tuttle

[57] ABSTRACT

A backwashable filtering device comprising a housing, a main filter in the housing, an inlet for receiving liquid into the housing and an outlet for discharging liquid from the housing. A rotatably mounted spraying member is disposed in the main filter which is preferably cylindrical in shape for receiving liquid and discharging it against the inner surface of the filter to backwash and cleanse the filter. Filtering passage is defined in the housing between the inlet and the outlet for directing water against an outer surface of the main filter for the purpose of filtering the water. Valves are provided in the housing associated with the main filter for selectively directing liquid toward the opposite sides of the main filter for the purposes of filtering and backwashing respectively.

10 Claims, 4 Drawing Figures

BACK-FLUSH FILTERING APPARATUS, PARTICULARLY FOR A HOUSE WATER SUPPLY SYSTEM

FIELD AND BACKGROUND OF THE INVENTION

The present invention relates in general to filtering apparatus and, in particular to a new and useful filtering and backwash apparatus, particularly for filtering water supplied to a house.

Such filter apparatus are known per se. Their inlet is connected to the house water main and their outlet leads to the points of utilization. They prevent soiling matter entrained by the water, such as sand, and other particles, from penetrating to the consuming points and causing trouble or even damages. The main filter is passed by the water permanently in the same direction, so that dirt, etc. becomes deposited on the upstream side of the filter. The more the filter is choked with extraneous matter, the higher the resistance to flow becomes and the pressure drop in the filter. To restore the initial state, the filtering apparatus must be cleaned from time to time. This is advantageously done by reversing the flow through the filter, for which purpose the design is suitably adapted. During the reversal or back-flushing, the flow is directed against the down-stream side of the filter, so that the initial upstream side now becomes the downstream side. Due to this reversal of flow through the filter, dirt deposits or the like are broken away and drained along with the wash water through an outlet which has been open during the back-flush operation. Advantageously, the outlet of the filter remains closed during this time, which may be done simultaneously with the reversal to back-flush.

As a rule, the pressure in the house water main is predetermined, i.e. it cannot be varied. Further, requirements on the purity of water determine the mesh size of the filter. On the other hand, the velocity of water flow through the filter depends on the pressure in the piping and on the size of the screen apertures. This means that the purifying effect during the back-flush is greater in more choked filters than in less choked ones where the passages through the filter have not yet been too strongly reduced. This is related to the fact that with a reduction of the sectional area of the individual screen apertures, the flow velocity therethrough increases and that with an increased flow velocity, the adhering particles are more easily broken away than at a relatively slower velocity.

Even with a heavily clogged screen, an unfavorable cleaning effect may be obtained if, first, larger portions of the dirt layer are broken away at different locations and the flushing water then flows only through these exposed portions of the filter while the other, still heavily clogged filter portions hardly allow any passage of water.

SUMMARY OF THE INVENTION

The invention is directed to an apparatus of the above-mentioned kind which permits a satisfactory cleaning of both slightly and heavily clogged filters by back-flushing or washing.

Accordingly, an object of the present invention is to provide a filtering apparatus with backwash capability particularly for a house which utilizes a spray or squirting means rotatably mounted within a main filter which has nozzles which are directed against an interior of the main filter to flush the water of debris.

In the following, merely the term "water" is used for the back-flushing fluid, although the invention is applicable to any other liquid and is by no means limited to water. The entire back-flush water is supplied to the interior of the spray or squirt device which, at least during the back-flush operation, performs a rotary motion. Due to the relatively small sectional outflow area which is formed by the entirety of the discharge apertures, the back-flush water leaves the spray or squirt device at a very high velocity, thereby producing the above-mentioned strong cleaning effect. The respective portion of the filter which happens at that instant to be within the range of spraying or squirting and on which the jet or jets impinge is always cleaned. It is evident that for this purpose the filter should have a tubular, advantageously circular shape so that the spray or squirt device is disposed within the filter. Advantageously, the spray or squirt device executes a continuous rotary motion. In this way, as mentioned, one portion after the other extending in the longitudinal direction of the filter is cleaned, irrespective of whether it is heavily or slightly clogged. To be able to satisfactorily clean also the top and bottom areas of the filter, it is advantageous to provide a height of the spray of squirt device, measured in the direction of the axis of rotation thereof, which corresponds to that of the filter. Further, the use of a flat nozzle is to be preferred as a rule to a row of nozzle orifices. As a matter of course, the spray or squirt device may be provided with a plurality of discharge apertures, nozzles or the like, especially such ones which are uniformly distributed over the circumference of the device, with two oppositely located flat nozzles being preferred.

In a particularly preferred embodiment of the invention, the spray of squirt device may be driven hydraulically by the outflowing liquid. This is obtained by an appropriately designed shape and arrangement, particularly in the zone of the nozzles, etc.

A further object of the present invention is to provide a back-flush filtering apparatus wherein the spraying device or means comprises a body portion of cylindrical shape having an opening at one end thereof, with a height corresponding substantially to that of the main filter. At least one discharge nozzle is connected to the body portion and directed obliquely to the radial passing through the nozzle orifice for imparting rotation to the spray means when water passes therethrough. With a constant water pressure, the spray or squirt device of this design rotates at a constant speed under the reaction force of the water jet or jets.

Another variant of a back flush filtering apparatus with a spray or squirt device having a circularly cylindrical basic body provides that the body is rotatably journaled through pins to the filter housing with the one journal pin forming an inlet. Preferably, the entire stream or squirt device may be made in one piece and of a plastic, for example, by injection moulding.

A still further object of the present invention is to provide a filtering apparatus comprising first and second shutoff valves with the first valve being provided in the path of flow during normal operation and the second valve being provided in the path of flow during the back-washing operation. Both first and second shutoff valves are provided between an inlet of the filtering apparatus and the main filter. The first shutoff valve opens during normal operation and the second shutoff valve opens during backwashing operation. A third shutoff valve is provided in the path of flow during the backwashing operation between the second shutoff valve and the inlet into the spray device or means by which the connection is closed between an inner space substantially defined by the spray means and the main filter and the flow space formed between the second shutoff valve and the spray means inlet.

Thereby, the entire water flowing through the inlet of the filtering apparatus and through the open second shut-off valve is forced to enter the interior of the spray or squirt device, so that it serves the purpose without losses for the cleaning process. During the cleaning process, the first shut-off valve is closed, and the waste water is drained through a closable discharge outlet.

Another object of the present invention is to provide a filtering device with backwash apparatus wherein the third shutoff valve has a closing member designed as a sleeve which is slidably received in a tubular extension of the main filter and cooperates with at least one passage in the circumference of the tubular extension.

In the upper end position of the sleeve, all slots are completely cleared, while in the other end position, the slots are completely shut by the sleeve, so that the water flowing through the sleeve cannot but flow into the interior of the spray or slot device. During normal operation, after having passed through the main filter from the outside inwardly, the water flows through the slots of the tubular extension and then through the sleeve, which is in its clearing position, to the outlet of the filtering apparatus. Hence, it is particularly advantageous if the sleeve is provided with an outwardly projecting lifting flange, so as to be lifted into its clearing position by the water flowing in under pressure. The lifting flange is advantageously designed as a stop member for the open position of the third shut-off valve. With a vertical arrangement, the sleeve returns into its lower, sealing position under its own weight and/or due to the hydraulic pressure.

An object of the present invention is also to provide a backwash filtering apparatus wherein the third shutoff valve is designed as a resilient funnel-shaped sleeve made, for example, of rubber or the like which is mounted over a funnel-shaped valve sleeve having at least one passage therethrough.

Depending on the flow direction, the closing member either covers the openings (during the back-flushing operation) or clears them. This valve operates as a clack valve and has the advantages of that type of valves.

Another object of the invention is to provide a back-washing filter apparatus wherein the tubular extension of the main filter forms a closing member for the second shutoff valve as well with a tubular inner extension of the filter housing having at least one port therethrough coverable by the tubular extension of the main filter to form the valves.

The use of tubular parts in the interior of this apparatus has advantages in the flow conduction and, in addition, contributes to the rugged construction. As a rule, always a plurality of openings, rows or apertures, etc. preferably uniformly distributed over the circumference, will be provided at the respective locations.

The tubular casing extension is advantageously concentrically surrounded by a preliminary filter preventing dirt and other contaminating matter from penetrating through the second and third valves or to the spray or squirt device. Finally, in still another development of the invention, it is provided that a flange extending from the filter cooperates with a ring on the housing to form first shutoff valve. The outer flange may be formed integrally on the extension, or manufactured separately and held in place in a suitable manner, for example, through a thread. In this last mentioned case, the flange may advantageously be used in addition for supporting the tubular main filter.

A still further object of the invention is to provide a backwashing filter apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Two embodiments of the invention are shown in the accompanying drawings in which.

DESCRIPTION OF THE PREFERRED EMBODIMENTS

Figure 1:
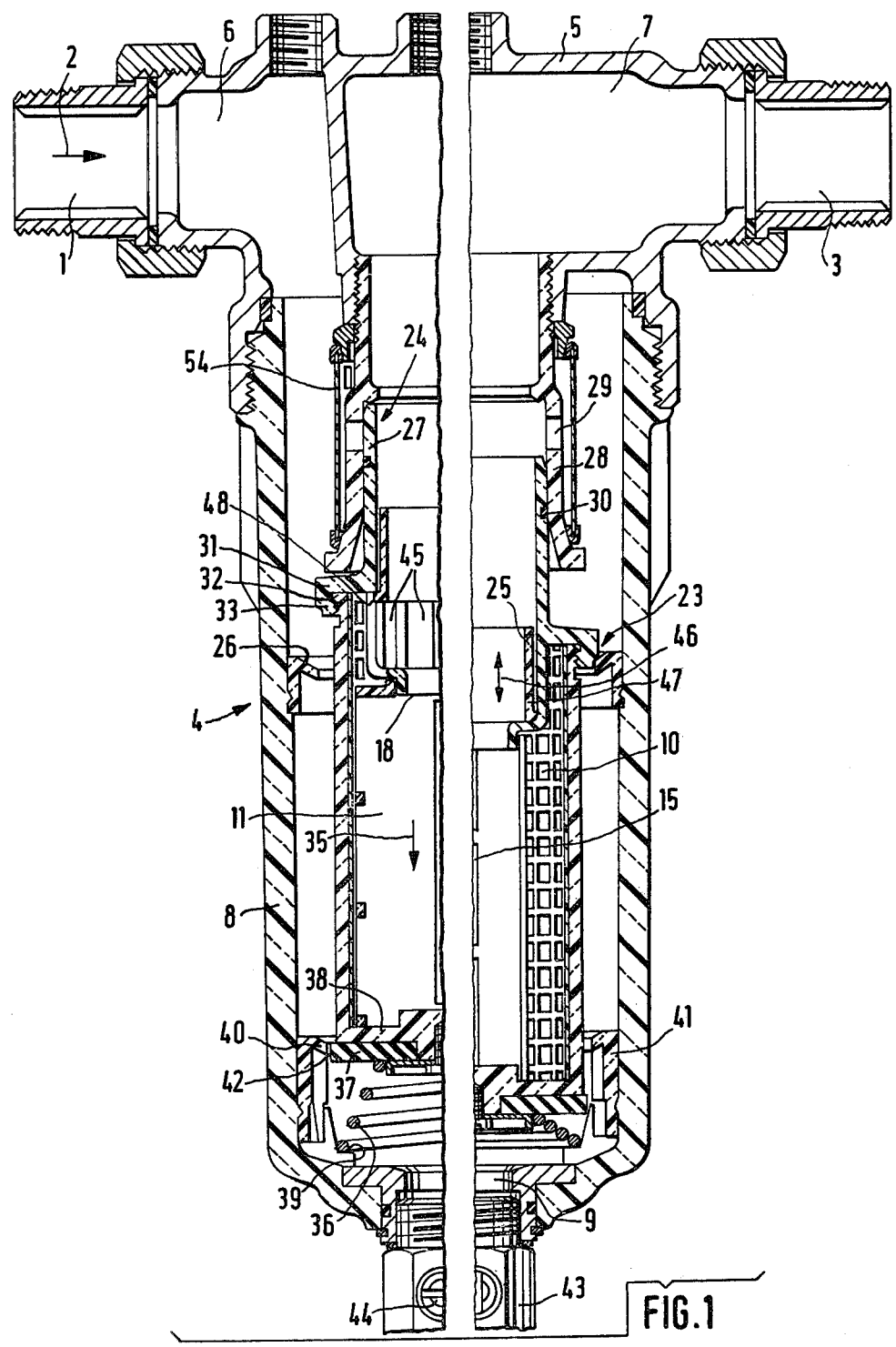
FIG. 1 is a longitudinal, vertical sectional view of the first embodiment, with the left hand side of the figure showing the filtering apparatus during normal operation, while the right hand side of the figure shows the position of the component parts during the back-flush operation.

The inventive apparatus comprises an inlet 1 through which the un-filtered fluid, particularly water, enters in the direction of arrow 2, and an outlet 3 through which the filtered water flows to the point or points of utilization (not shown).

A housing or casing 4 of this filtering apparatus, substantially includes an upper part 5 which may be provided with a pressure-gauge connection for checking the pressure, and/or with an air vent, and a lower part 8 which is provided with a closable outlet 9 for draining the waste water from the filter during backwashing. The upper part 5 of the casing forms an inlet pressure chamber 6 and an outlet pressure chamber 7. The lower part 8 of the casing is preferably made of plastic for example a transparent plastic permitting an inspection the interior of the filtering apparatus from the outside, particularly to check the degree of clogging of a main filter 10. The upper casing part, on the contrary, is made of metal, particularly a rustproof metal. The two screw connections of the inlet and outlet are coaxial with each other, to permit the filtering apparatus to be inserted in a straight pipe conduit. They make it possible, in addition, to easily exchange the filtering apparatus if later necessary.

Figure 2:
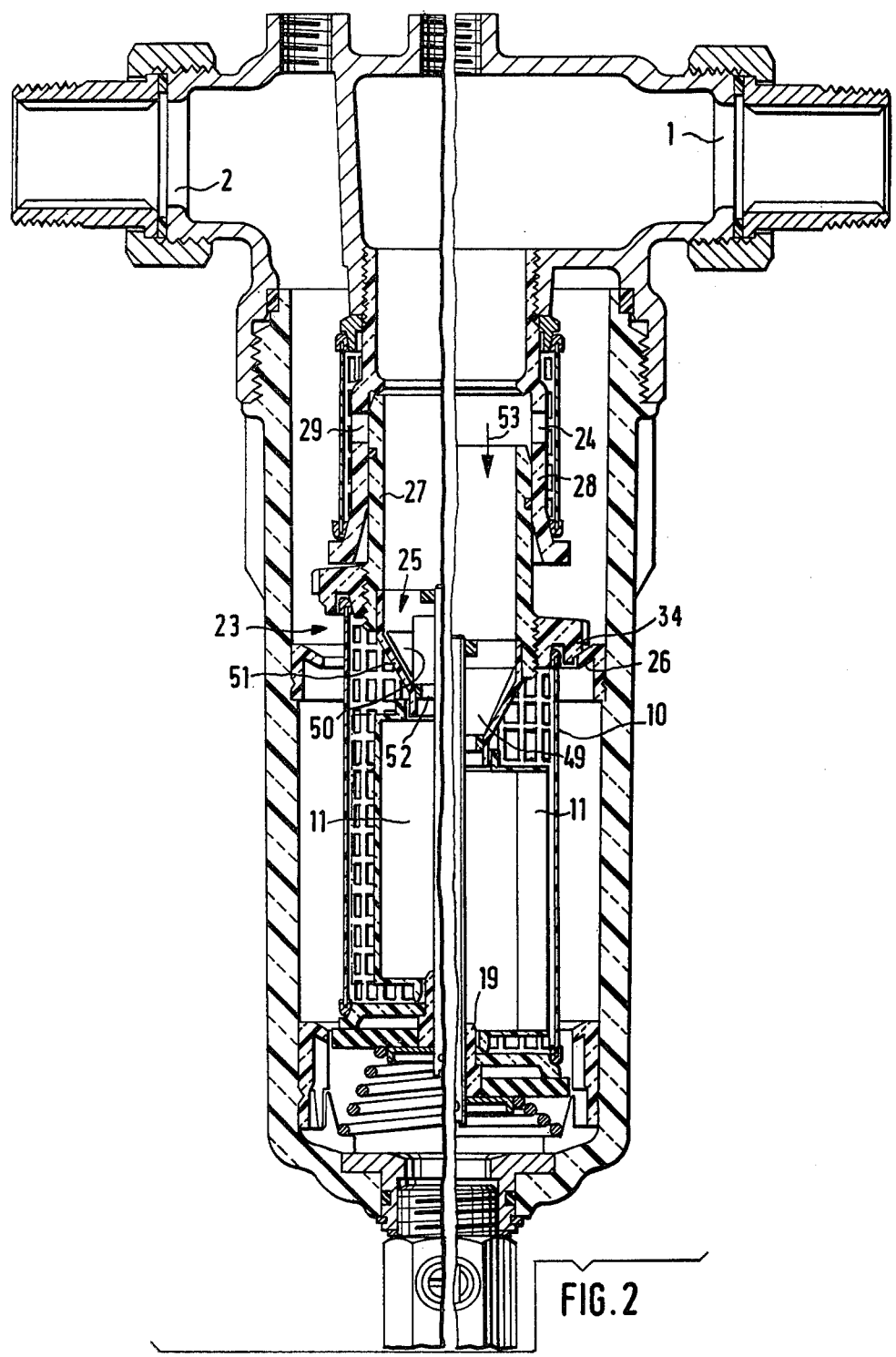
FIG. 2 is a view similar to FIG. 1 of a second variant of the invention, with the right hand side of the figure showing the position of the component part during the back-flush operation.
Figure 3:
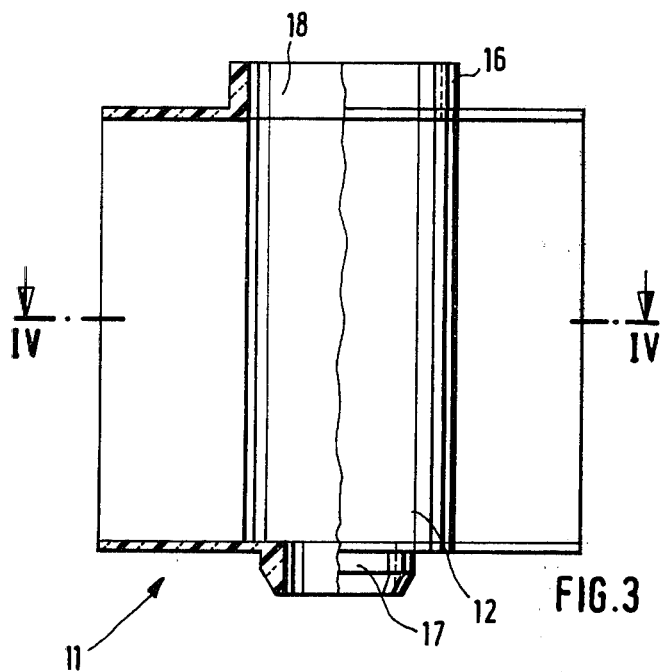
FIG. 3 is a view of the spray or squirt device, partly in section.
Figure 4:
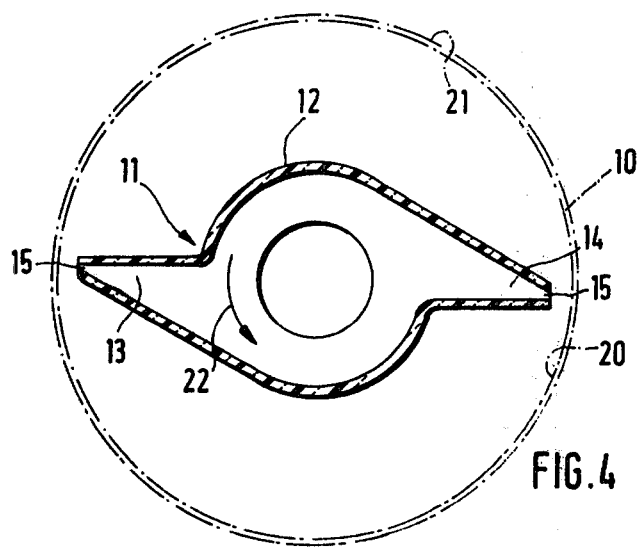
FIG. 4 is a section taken along the line IV—IV of FIG. 3, with the main filter shown diagramatically.

The main filter 10 has a circularly cylindrical shape and accommodates in its interior a spray or squirt device 11 designed in accordance with the invention. The device in the shown embodiment substantially comprises a cylindrical, preferably circularly cylindrical, basic body 12 provided with two flat nozzles 13 and 14 which, in particular, are formed on the circumference thereof and offset by 180° (see FIGS. 3 and 4). The discharge aperture 15 of the nozzles may be continuous or, in accordance with the showing on the right hand side of FIG. 1, interrupted. The center line of the nozzle is laterally offset relative to a radial plane passing through basic body 12, in order to produce the necessary moment of rotation as the water flows out of the spray or squirt device. Therefore, no separate drive is needed for the device, the rotation is rather imparted hydraulically, and for this reason, a journal pin 16 and 17, respectively, is provided on the top and the bottom of the device. At least the top pin 16 is tubular and forms at the same time an inlet 18 for the water which is to be discharged through nozzles 13, and 14. If the pin 17 at the bottom is also tubular, its bore must be suitable closed in its assembled state, for example by a bearing plug 19 (FIG. 2). As shown in FIG. 4, the discharge apertures 15 of nozzles 13,14 are directed against the inner wall 20 of main filter 10 concentrically surrounding the spray or squirt device 11. The powerful water jets discharged from the nozzles during the backwash operation penetrate through the apertures of main filter 10 from the inside outwardly and break away the dirt deposited during normal operation on the outer wall 21 of main filter 10. During one revolution of spray or squirt device 11, for example in the direction of arrow 22 and with two nozzles being provided, every spot of main filter 10 is swept twice by a relatively sharp water jet. The filtering apparatus comprises a first shut-off valve 23, a second shut-off valve 24, and a third shut-off valve 25. In normal operation (left hand side of FIG. 1), first shut-off valve 23 is open and second shut-off valve 24 is closed. Therefore, the water flows from inlet 1 through inlet pressure chamber 6 and valve seat 26 of first shut-off valve 23 to main filter 10 through which it passes from the outside inwardly. Then, the filtered water leaves the apparatus through outlet pressure chamber 7 and outlet 3.

The second shut-off valve 24 is designed as a gate and is formed by a tubular extension 27 of main filter 10 and a tubular inner extension 28 of the casing provided with ports which are distributed over the circumference, in particular uniformly. Extensions 27 and 28 are sealed relative to each other by means of an O- ring 30 which is inserted in an outer groove of tubular extension 27. With extension 27 in its upper end postion, ports 29 are shut, i.e. the second shut-off valve 24 is closed, while with extension 27 in its lower end position as shown in FIG. 1 at the right hand side, valve 24 is open.

As shown in FIG. 1, tubular extension 27 is formed with a securing flange 31 having an angular cross section, by means of which it is supported, through a thread 32, on main filter 10 and which at the same time forms the valve disc 33 of first shut-off valve 23.

In contradistinction thereto, in the embodiment of FIG. 2, a ring 34 is screwed to an external thread of tubular extension 27, forming the upper support for the filter body of main filter 10 and also forming the valve disc 33 of first shut-off valve 23.

It follows from the foregoing that only one of valves 23 or 24 can be open at the same time. In normal operation, as mentioned, first shut-off valve 23 is open while second shut-off valve 24 is closed. During the backflush operation, their positions are reversed. The backflow is obtained by moving the sub-assembly comprising the tubular extension 27, main filter 10, and spray or squirt device 11, by appropriate mechanical means (not shown or by water pressure) and in the direction of arrow 35, from its upper end position shown at the left hand side of FIG. 1 against the action of a return spring 36, into its lower end position shown at the right hand side of FIG. 1. Return spring 36 bears indirectly, through a disc 37, against the bottom 38 of main filter 10 and, on the other side, against a shoulder 39 of the casing. The outer edge of disc 37 cooperates with the associated edge 40 of a tubular insert 41 received in the lower part 8 of casing, with only a throttling gap 42 remaining therebetween during normal operation. It should be noted in this connection that in a manner known per se, the drain outlet 9 can be closed or opened by means of a shut-off mechanism designed as a stop cock. The position of the stop plug 44 of the cock can be checked from the outside by means of a mark.

As already mentioned, during normal operation the water flows through main filter 10 in the radial direction and encounters the outer surface of the wall of spray or squirt device 11 along which it flows upwardly, against the direction of arrow 35. The water then passes into the interior of tubular extension 27 through passages 45 which are provided in this extension 27 and, in particular, having the shape of oblong slots and which are uniformly distributed over the circumference. These passages 45 can be shut or cleared by means of a sleeve 47 which is displaceable in the direction of double arrow 46. Sleeve 47 and the portion provided with passages 45 of tubular extension 27 form the third shut-off valve 25. In normal operation, the third shut-off valve 25 is open, because sleeve 47 is in its lifted position clearing passages 45. The sleeve remains in this position due to the liquid flow. The upward displacement is effected by means of a lifting flange 48 which is provided on the lower end of sleeve 47 and forms a stop for the upper position at the same time.

During the backwashing operation, third shut-off valve 25, or its closing member designed as a sleeve 47, prevents the water which has penetrated into tubular extension 27 through port 29 of second shut-off valve 24, from escaping to passages 45, and forces it to flow through inlet 18 into the interior of spray or squirt device 11.

In the embodiment of FIG. 2, the design of third shut-off valve 25 is somewhat different, however, the function of the valve is the same as in FIG. 1. The closing member of third shut-off valve 25 is designed as a resilient, funnel-shaped sleeve 49, preferably made of rubber or the like, by which again passages 50 of an also funnel-shaped valve sleeve 51 are cleared or shut. Valve sleeve 51 is formed by the end portion adjacent main filter 10 of tubular extension 27 of spray or squirt device 11, and, in this embodiment, extension 27 is preferably designed as a two-part element. Resilient sleeve 49 is formed, on its small-diameter end, with a retaining ring 52 which is received and suitably held in place in the lower end portion of funnel-shaped valve sleeve 51. As during the back-flush or washing operation the water flows from above downwardly (direction of arrow 53), resilient sleeve 49 enlarges and snugly engages the inside surface of valve sleeve 51 so that passages 50 are shut-off. In normal operation, the water flows through passages 50 from the outside inwardly and urges the resilient sleeve aside, so that passages 50 are cleared.

To prevent dirt during the back-flush operation from penetrating into the interior of the filtering apparatus and, particularly, into the zone of the second and third shut-off valves, tubular extension 28 of the casing is concentrically surrounded by an ante filter 54.

We claim:

1. An improved liquid filtering device of the type having a housing, the housing having an inlet connection and an outlet connection for respectively receiving and discharging a flow of liquid to be filtered, a cylindrical filter element mounted in the housing intermediate the inlet connection and the outlet connection, the cylindrical filter element having filtering apertures extending therethrough at longitudinally and circumferentially spaced intervals between a cylindrical outer surface and a cylindrical inner surface, the housing having an internal first passage for passing the flow of liquid from the inlet connection to the cylindrical outer surface and an internal second passage for passing the flow of liquid from the inlet connection to the inner cylindrical surface, movable means in the housing for alternatively diverting the flow from the inlet connection to one of the first and second passages, the improvement comprising, in combination therewith, spray means rotatably mounted within the cylindrical filter member for receiving the flow from the second passage and rotatably spraying the flow against the cylindrical inner surface, and wherein the movable means includes an elongated tubular extension having an extension passage extending therethrough, and sleeve means movably mounted to said elongated tubular extension for alternatively clearing said extension passage to permit the passage of flow from the inlet connection to outlet connection and closing said extension passage to prevent the passage of flow from the inlet connection to the outlet connection, said sleeve means being operable to clear and close said extension passage responsive to the position of tubular extension.

2. The improved liquid filtering device as set forth in claim 1, wherein said spray means comprises at least one nozzle for discharging the liquid therefrom and passing the liquid to the cylindrical inner surface, said nozzle being positioned to impart rotation to said spray means responsive to the discharge of the liquid therefrom.

3. The improved liquid filtering device as set forth in claim 2, wherein said spray means includes a cylindrical body having an opening at one end for receiving the liquid and a length substantially corresponding to the length of the cylindrical filter element, said cylindrical body being mounted concentrically with said cylindrical filter element, and said nozzle extending obliquely from said cylindrical body with respect to a radial plane of said cylindrical body.

4. The improved filtering device as set forth in claim 3, including at least one journal pin connected to each end of said cylindrical body for rotatably mounting said spray means to said cylindrical filter element, said open end of said cylindrical body communicating with said housing outlet.

5. The improved liquid filtering device as set forth in claim 2, wherein said tubular extension is formed with a bore, and said sleeve means comprises a sleeve slidably received in said bore of said tubular extension, said sleeve being displaceable within said bore to clear and close said extension passage.

6. The improved liquid filtering device as set forth in claim 3 wherein said sleeve includes flange means for moving said sleeve responsive to the flow of the liquid.

7. The improved liquid filtering device as set forth in claim 2, wherein said tubular extension is formed with a bore and includes a funnel-shaped valve sleeve having said extension passage, said sleeve means comprise a resilient member mounted in said bore adjacent said extension passage, and wherein said resilient member is operable to clear and close said extension passage responsive to the flow of the liquid.

8. The improved liquid filtering device as set forth in claim 7 wherein said resilient member has a funnel-shape, and said resilient member is mounted in said funnel-shaped valve sleeve.

9. The improved liquid filter as set forth in claim 3, wherein the housing includes a tubular inner extension member and the second passage includes at least one port radially extending through said tubular inner extension member, said tubular extension being slidably received in said tubular inner extension member, further comprising seal means for providing a fluid tight seal about said tubular extension to prevent leakage of liquid between said tubular extension and said tubular inner extension member, and said port being hydraulically communicable with said outlet connection.

10. The improved liquid filter as set forth in claim 9, further comprising an antefilter concentrically surrounding said tubular inner extension member.

* * * * *